March 20, 1956  R. B. REGIER  2,739,035

METHOD OF MEASURING TEMPERATURE

Filed May 28, 1951  2 Sheets-Sheet 1

INVENTOR.
R. B. REGIER
BY
Hudson & Young
ATTORNEYS

March 20, 1956 R. B. REGIER 2,739,035
METHOD OF MEASURING TEMPERATURE
Filed May 28, 1951 2 Sheets-Sheet 2

INVENTOR.
R. B. REGIER
BY
Hudson & Young
ATTORNEYS

United States Patent Office 2,739,035
Patented Mar. 20, 1956

2,739,035

METHOD OF MEASURING TEMPERATURE

Robert B. Regier, Knoxville, Tenn., assignor to Phillips Petroleum Company, a corporation of Delaware Application May 28, 1951, Serial No. 228,637

16 Claims. (Cl. 23—1)

This invention relates to a method for measuring a maximum temperature in a high temperature region or of measuring a time-temperature integral in such region. In another aspect, it relates to a novel temperature-measuring apparatus which is suitable for use in furnaces, such as those of the pebble heater type or of a type suitable for producing carbon black.

It is an object of the invention to provide a novel temperature or time-temperature measuring method which is particularly adapted for use in furnaces or other high temperature regions which are relatively inaccessible to ordinary temperature-measuring devices.

It is a further object to provide apparatus which is of simple construction, and which gives reliable results in actual temperature or time-temperature measurements.

Various other objects, advantages and features of the invention will become apparent from the following detailed description taken in conjunction with the accompanying drawings, in which.

Figure 1:
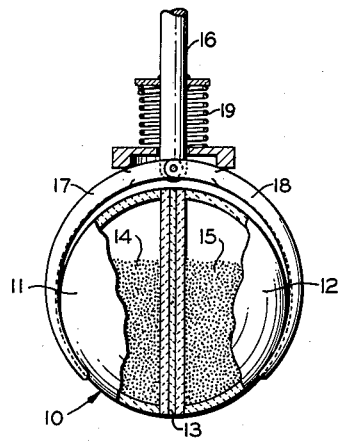
Figure 1 is an elevational view, partially in section, of suitable apparatus for carrying out the invention.

The invention resides in the introduction of measured amounts of two dissociable compounds into a region at which it is desired to measure the temperature or time-temperature integral. Hereinafter, in this specification, only temperature measurements will be referred to but it will be understood that, in the event it is desired to measure a maximum temperature, the time of exposure of the compounds in the high temperature region is uniform during each of several successive measurements. In contrast, if it is desired to measure the time-temperature integral, the compounds are exposed within the high temperature region during the entire period over which the measurement is desired.

In accordance with the invention, the compounds utilized in making the measurement are dissociable, under the influence of the high temperature to be measured, into a volatile portion and a non-volatile portion, the extent of such dissociation being proportional to the temperature and to the time of exposure to such temperature. Preferably, but not necessarily, the two compounds have the same elemental composition. That is, the elements in the two compounds are the same and they are combined in the same proportions to form the compounds. However, in accordance with the invention, at least one element of the composition is radioactive in one of the two compounds and non-radioactive in the other compound, the element last specified being part of the volatile dissociation product. During the period of measurement, the volatile portions are permitted to intermingle so that there is an exchange of radioactive and non-radioactive material between the two compounds, the extent of the exchange being proportional to the temperature to which the compounds are exposed. Thus, when the relative radioactivity of the two compounds is measured after exposure thereof to high temperature and cooling, a direct indication is obtained as to the temperature of exposure.

The preferred materials for use as the compounds to be exposed are the alkaline earth metal carbonates and sulfates, of which I prefer to employ calcium carbonate, barium carbonate, magnesium carbonate, strontium carbonate and beryllium carbonate together with the corresponding sulfates, either individually or in combination. In the experimental work conducted in accordance with the principles of the invention, calcium carbonate was found to be the preferred material. In one experimental investigation, a plug of quartz wool was placed in the bend of a 7/32 inch I. D. U-tube, the arms of which were about 2 inches long. A measured quantity of ordinary calcium carbonate was placed in one of the two compartments thus formed, and a measured quantity of calcium carbonate containing radioactive carbon was placed in the other compartment, the quartz wool plug permitting the intermingling of gaseous dissociation products of the calcium carbonate but preventing intermingling of the solid dissociation products. After exposure of the assembly to the high temperature to be measured, the tube was cooled and the radioactivity of the two cooled portions of calcium carbonate was determined. It was found that the relative radioactivity was proportional to the temperature of exposure.

In Figure 1, I have illustrated a type of measuring apparatus which is suitable for use in making commercial temperature measurements. This structure includes a spherical capsule 10 divided into a pair of compartments 11, 12 by a partition 13, the compartment 11 containing a measured amount 14 of a dissociable alkaline earth metal carbonate, such as barium carbonate or calcium carbonate, and the compartment 12 containing a measured amount 15 of a similar compound in which the carbon is a radioactive isotope. Partition 13 is permeable to the gaseous dissociation products of the compounds in compartments 11, 12 but impermeable to the solid compounds themselves or their solid dissociation products. The capsule 10 is supported by a rod 16 having a pair of pivoted curved arms 17, 18 which are urged into engagement with the capsule by a spring 19. In this manner, the capsule is adapted to be suspended in a region where temperature is to be measured.

When the capsule is exposed to a high temperature, a portion of the radioactive gaseous dissociation products pass through the partition 13 into compartment 11 and a portion of the non-radioactive gaseous dissociation products pass through partition 13 into compartment 12, the extent of dissociation and exchange being proportional to the temperature of exposure. After removing the capsule from the high temperature zone and cooling it, the relative radioactivity of the measured amounts 14, 15 of the test compounds provide a direct indication of the temperature to which they are exposed.

Figure 2:
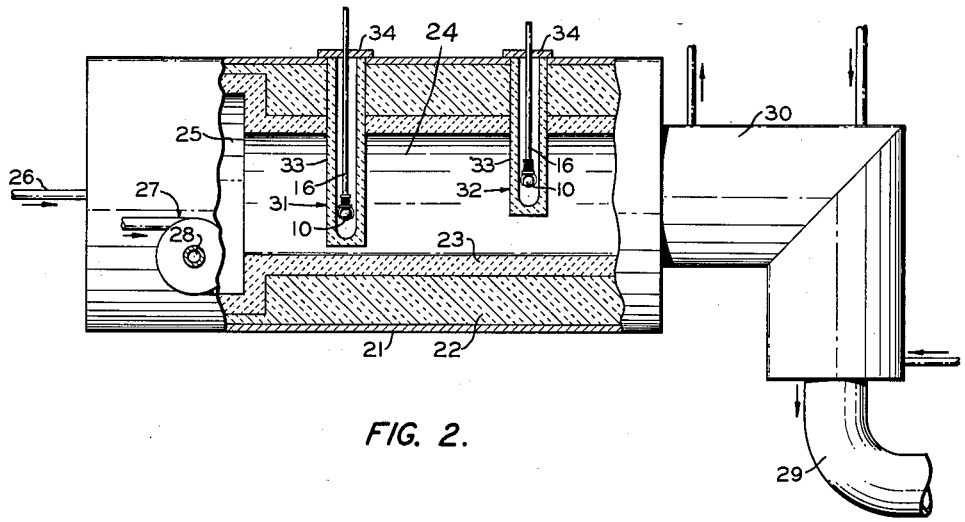
Figure 2 is a vertical sectional view, partially in elevation, of a carbon black furnace utilizing the temperature-measuring apparatus of this invention.

In Figure 2, I have illustrated the application of the temperature-measuring method and apparatus of my invention to a commercial carbon black furnace. This furnace includes a cylindrical metal shell 21 inclosing refractory structures 22 and 23 which define a cylindrical reaction chamber 24 and an enlarged annular combustion chamber 25. A vaporized oil is fed axially into the chambers 25, 24 through a line 26, and air or a mixture of air and combustion gases is fed tangentially into the combustion chamber 25 through an injector 27 including a tangential pipe 28. In this manner, the axial hydrocarbon stream is surrounded by a spirally swirling blanket of air or air and combustion gases. In the chamber 24, a severe cracking of the hydrocarbon stream takes place with resultant formation of carbon black and gaseous reaction products which leave the reactor through a flue 29 having a water-jacketed portion 30. The construction and operation of the carbon black furnace is shown in more detail by the application of J. C. Krejci, filed April 25, 1947, entitled Production of Carbon Black, Serial Number 743,893, and now Patent No. 2,564,700.

In accordance with the invention, I provide a pair of wells 31 and 32 spaced at different distances from the combustion chamber 25 within the reaction chamber 24. For purposes of clarity, the size of these wells is substantially exaggerated upon the drawing. Each well includes a closed cylindrical member 33 of heat-conductive refractory metal, the outer end of each well being closed by a cap 34. Suspended in each of the wells is an assembly of the type described in connection with Figure 1 and, upon exposure of the compounds within the capsule 10 to the high temperature existing in the reaction zone 24, a direct indication of temperature is obtained in the manner discussed in connection with Figure 1.

Figure 3:
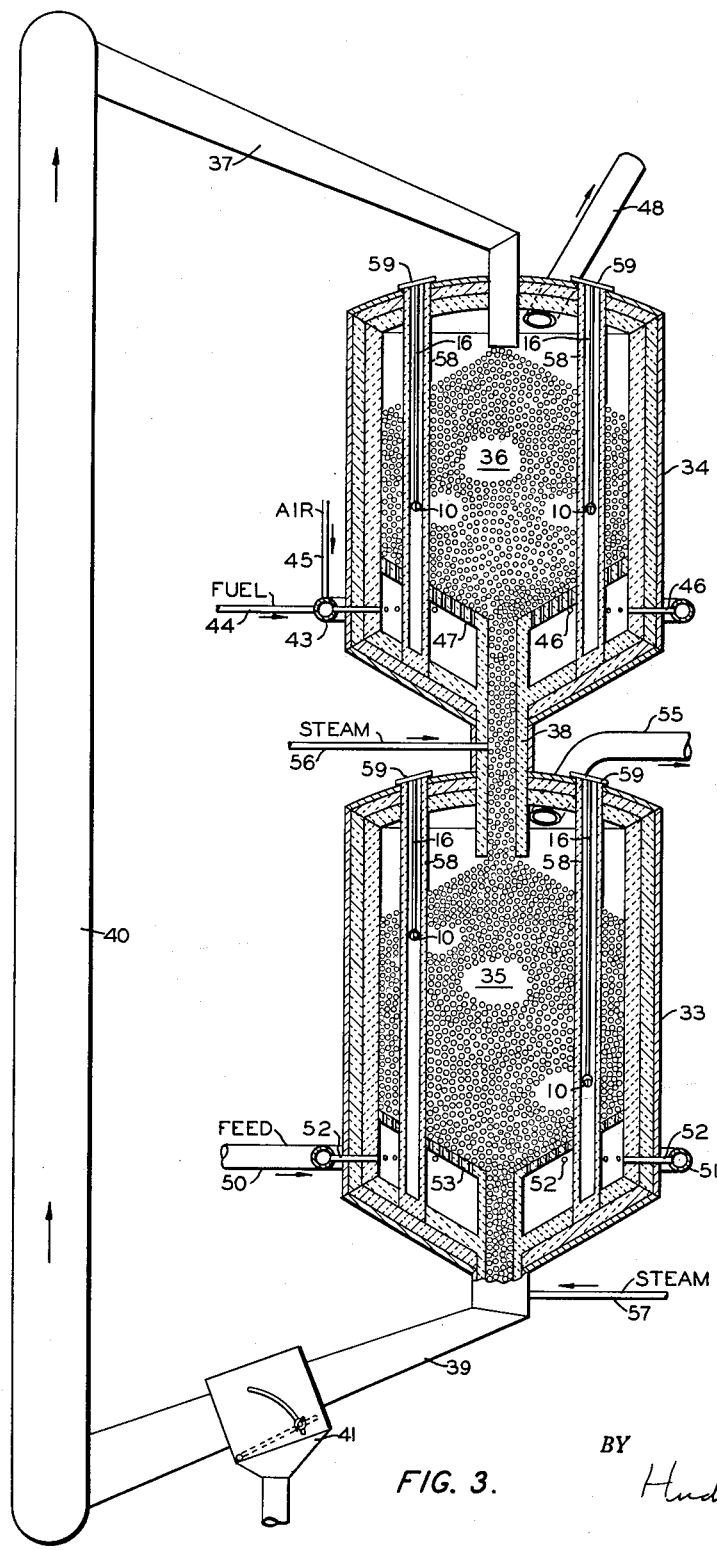
Figure 3 is a vertical sectional view, partially in elevation, of a pebble heater system utilizing the temperature-measuring apparatus of this invention.

In Figure 3, I have shown the application of the method of this invention to make temperature measurements in a thermal cracking reactor of the pebble heater type. This apparatus includes a pair of superposed reaction vessels 33 and 34 defining high temperature regions or reaction zones 35 and 36. A continuous circulation of refractory pebbles is maintained through the system, the pebbles entering vessel 34 through inlet 37, and passing downwardly through reaction zone 36 and a pipe 38 to reaction zone 35. The pebbles leave the reaction zone 35 through an outlet 39 and are returned to inlet 37 by a bucket elevator 40, a hopper 41 being provided for the withdrawal of pebbles from the system. A combustible measure of fuel and air is introduced into reaction zone 36, the fuel and air being fed to an annular pipe 43 through lines 44 and 45, respectively. From the pipe 43, the mixture enters the lower portion of vessel 34 through injection nozzles 46, and, thence, passes through perforated grid 47 and the pebbles to the top of the vessel, the combustion reaction in the zone 36 heating the pebbles to a desired temperature, and the combustion products being withdrawn from the top of vessel 34 through a line 48.

A hydrocarbon feed stock to be converted is introduced through a line 50, an annular pipe 5, and distribution nozzles 52 into the lower part of vessel 33, the hydrocarbon stream passing upwardly through a perforated grid 53, the bed of heated pebbles in reaction zone 35 to the top of the vessel, from which converted hydrocarbons are withdrawn by a line 55. It will be noted that stripping stream is introduced into the outlet pipe of vessel 34 by a line 56 and into the outlet pipe of vessel 33 by a line 57.

In accordance with the invention, each of the vessels 33, 34 is provided with a plurality of wells 58. Each well consists of a cylindrical portion of heat-conductive refractory metal which is closed at the bottom and provided at the top with a closure cap 59. As was the case in Figure 2, the size of each well is greatly exaggerated on the drawing for purposes of clarity. Suspended in each well is a capsule 10 of the type shown in Figure 1, the supporting rods 16 for the capsules being carried by the closure caps 59. Temperature measurements are made in the high temperature regions 35, 36 in the manner discussed in connection with Figure 1. It will be observed that the temperature measurement is very flexible as to the place of measurement since temperatures at different levels within the pebble beds can be readily determined merely by lowering or raising the capsules within the wells 58.

While the invention has been described in connection with a present, preferred embodiment thereof, it is to be understood that this description is illustrative only and is not intended to limit the invention, the scope of which is defined by the appended claims.

I claim:

1. A method of measuring temperature which comprises placing measured amounts of two compounds in a region where temperature is to be measured, both of said compounds being dissociable under the influence of said temperature into a volatile portion and a non-volatile portion, said volatile portions being of the same elemental composition, one element of said composition being preponderantly radioactive in the first compound and preponderantly non-radioactive in the second compound, maintaining said compound at said temperature for a predetermined time while permitting intermingling of said volatile portions and preventing intermingling of said non-volatile portions, and thereafter determining the relative radioactivity of said compounds.

2. A method of measuring temperature which comprises placing measured amounts of two compounds in a region where temperature is to be measured, both of said compounds being dissociable under the influence of said temperature into a volatile portion and a non-volatile portion, said volatile portions being of the same elemental composition, one element of said composition being radioactive in the first compound and non-radioactive in the second compound, maintaining said compound at said temperature for a predetermined time while permitting intermingling of said volatile portions and preventing intermingling of said non-volatile portions, withdrawing said compounds from said region, cooling said compounds, and thereafter determining the relative radioactivity of said compounds.

3. A method for measuring temperature which comprises placing measured amounts of a radioactive carbonate and a non-radioactive carbonate in a region where temperature is to be measured, maintaining said compounds within said region while permitting intermingling of gaseous dissociation products from said compounds and preventing intermingling of non-volatile dissociation products, removing said compounds from said region and cooling same, and determining the relative radioactivity of the cooled compounds.

4. A method for measuring temperature which comprises placing measured amounts of a radioactive alkaline earth metal carbonate and a non-radioactive alkaline earth metal carbonate in a region where temperature is to be measured, maintaining said compounds within said region while permitting intermingling of gaseous dissociation products from said compounds and preventing intermingling of non-volatile dissociation products, removing said compounds from said region and cooling same, and determining the relative radioactivity of the cooled compounds.

5. A process in accordance with claim 4 wherein said compounds are radioactive calcium carbonate and non-radioactive calcium carbonate, respectively.

6. A process in accordance with claim 4 wherein said compounds are radioactive barium carbonate and non-radioactive barium carbonate, respectively.

7. A process in accordance with claim 4 wherein said compounds are radioactive magnesium carbonate and non-radioactive magnesium carbonate, respectively.

8. A process in accordance with claim 4 wherein said compounds are radioactive strontium carbonate and non-radioactive strontium carbonate, respectively.

9. A process in accordance with claim 4 wherein said compounds are radioactive beryllium carbonate and non-radioactive beryllium carbonate, respectively.

10. In apparatus for measuring temperature, a closed vessel, a partition dividing said vessel into two compartments, a dissociable radioactive material in one compartment, and a non-radioactive dissociable material in the other compartment, said partition being permeable to gaseous dissociation products of said materials, but not to solid dissociation products of said materials.

11. An apparatus constructed in accordance with claim 10 in which both of said substances have the same elemental composition.

12. The combination, with a furnace having a high temperature region, of a well extending into said region, a container, and means for supporting said container in said well, said container including a pair of compartments separated by a gas permeable member and having a quantity of radioactive dissociable material in one compartment and a quantity of non-radioactive dissociable material in the other compartment.

13. The combination, with a carbon black furnace having a generally cylindrical reaction zone defined by refractory walls, said zone constituting a high temperature region, means for introducing an axial stream of hydrocarbons into said zone, means for introducing a spirally swirling stream of air into said zone surrounding said axial hydrocarbon stream, and means for withdrawing carbon black and gaseous combustion products from said zone, of a well extending into said high temperature region, a container, and means for supporting said container in said well, said container including a pair of compartments separated by a gas permeable member and having a quantity of radioactive dissociable material in one compartment and a quantity of non-radioactive dissociable material in the other compartment.

14. The combination, with a thermal cracking system of the pebble heater type, said system including a pair of superposed reaction zones, means for circulating refractory pebbles downwardly from said first zone to said second zone and thereafter returning said pebbles to said first zone, means for introducing a fuel-air mixture into the bottom of said first zone and withdrawing gaseous reaction products from the top of said zone, and means for introducing a hydrocarbon feed stock to the bottom of said second zone and withdrawing converted hydrocarbons from the top of said second zone, each of said zones constituting a high temperature region, of a well extending into one of said high temperature regions, a container, and means for supporting said container in said well, said container including a pair of compartments separated by a gas permeable member and having a quantity of radioactive dissociable material in one compartment and a quantity of non-radioactive dissociable material in the other compartment.

15. A method of measuring temperature which comprises placing measured amounts of two compounds in a region where temperature is to be measured, both of said compounds being dissociable under the influence of said temperature into a volatile portion and a non-volatile portion, said compounds being selected from the group consisting of carbonates and sulfates, said volatile portions being of the same elemental composition, one element of said composition being radioactive in the first compound and non-radioactive in the second compound, maintaining said compound at said temperature for a predetermined time while permitting intermingling of said volatile portions and preventing intermingling of said non-volatile portions, withdrawing said compounds from said region, cooling said compounds, and thereafter determining the relative radioactivity of said compounds.

16. A method of measuring temperature which comprises placing measured amounts of two compounds in a region where temperature is to be measured, both of said compounds being dissociable under the influence of said temperature into a volatile portion and a non-volatile portion, said volatile portions being of the same elemental composition, one element of said composition being preponderantly radioactive in the first compound and preponderantly non-radioactive in the second compound, said compounds being selected from the group consisting of calcium carbonate, barium carbonate, magnesium carbonate, strontium carbonate, beryllium carbonate, calcium sulfate, barium sulfate, magnesium sulfate, strontium sulfate, and beryllium sulfate, maintaining said compound at said temperature for a predetermined time while permitting intermingling of said volatile portions and preventing intermingling of said non-volatile portions, and thereafter determining the relative radioactivity of said compounds.

References Cited in the file of this patent

UNITED STATES PATENTS

| 1,947,303 | Morgan | Feb. 13, 1934 |
| 2,432,873 | Ferro | Dec. 16, 1947 |
| 2,530,274 | Weber | Nov. 14, 1950 |
| 2,539,466 | Parry | Jan. 30, 1951 |
| 2,652,497 | Miller | Sept. 15, 1953 |

FOREIGN PATENTS

| 3,628 of 1912 | Great Britain | Feb. 13, 1913 |
| 402,011 | Great Britain | Nov. 23, 1933 |

OTHER REFERENCES

"Nuclear Fission and Atomic Energy," Stephens et al., published in 1948 by The Science Press, Lancaster, Pa., pages 234–239.